(12) United States Patent
Shinkawa et al.

(10) Patent No.: US 11,309,640 B2
(45) Date of Patent: Apr. 19, 2022

(54) WIRELESS COMMUNICATION DEVICE

(71) Applicant: YAMAHA CORPORATION, Hamamatsu (JP)

(72) Inventors: Tomohiro Shinkawa, Hamamatsu (JP); Hisanobu Suzuki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 19 days.

(21) Appl. No.: 17/101,344

(22) Filed: Nov. 23, 2020

(65) Prior Publication Data

US 2021/0075126 A1 Mar. 11, 2021

Related U.S. Application Data

(60) Division of application No. 16/006,026, filed on Jun. 12, 2018, now Pat. No. 10,892,563, which is a
(Continued)

(30) Foreign Application Priority Data

Dec. 18, 2015 (JP) .............................. JP2015-247893

(51) Int. Cl.
*H01Q 21/24* (2006.01)
*H04B 1/38* (2015.01)
*H01Q 19/10* (2006.01)
*H01Q 1/24* (2006.01)
*H04B 1/3888* (2015.01)
(Continued)

(52) U.S. Cl.
CPC .......... *H01Q 21/245* (2013.01); *H01Q 1/2291* (2013.01); *H01Q 1/245* (2013.01); *H01Q 1/38* (2013.01); *H01Q 15/14* (2013.01); *H01Q 19/10* (2013.01); *H04B 1/38* (2013.01); *H04B 1/3888* (2013.01); *H04B 1/40* (2013.01); *H04L 69/18* (2013.01)

(58) Field of Classification Search
CPC .......... H01Q 19/10; H01Q 15/14; H01Q 1/38; H01Q 1/245; H01Q 1/2291; H01Q 21/245
See application file for complete search history.

(56) References Cited

U.S. PATENT DOCUMENTS

| | | |
|---|---|---|
| 2004/0185901 A1 | 9/2004 | Kachi |
| 2005/0024276 A1 | 2/2005 | Izumi |
| 2010/0302109 A1 | 12/2010 | Takezaki |

FOREIGN PATENT DOCUMENTS

| | | |
|---|---|---|
| CN | 1532660 A | 9/2004 |
| CN | 103682635 A | 3/2014 |

(Continued)

OTHER PUBLICATIONS

International Search Report issued in Intl. Appln. No. PCT/JP2016/086860 dated Feb. 28, 2017. English translation provided.
(Continued)

*Primary Examiner* — Graham P Smith
(74) *Attorney, Agent, or Firm* — Rossi, Kimms & McDowell LLP (57) ABSTRACT

A wireless communication device includes a housing, a substrate provided inside the housing, an antenna provided on the substrate, a switching unit configured to switch directivity of the antenna between a first state and a second state, a detection unit configured to detect switching of the switching unit, and an output unit configured to output a detection result of the detection unit.

8 Claims, 11 Drawing Sheets

Related U.S. Application Data continuation of application No. PCT/JP2016/086860, filed on Dec. 12, 2016.

(51) Int. Cl.
  *H01Q 1/22*   (2006.01)
  *H01Q 1/38*   (2006.01)
  *H01Q 15/14*  (2006.01)
  H04B 1/40    (2015.01)
  H04L 69/18   (2022.01)

(56) References Cited

FOREIGN PATENT DOCUMENTS

| | | | |
|---|---|---|---|
| JP | 02043803 | A | 2/1990 |
| JP | 2000284854 | A | 10/2000 |
| JP | 2005026943 | A | 1/2005 |
| JP | 2011015295 | A | 1/2011 |
| JP | 2011061861 | A | 3/2011 |

OTHER PUBLICATIONS

Written Opinion issued in Intl. Appln. No. PCT/JP2016/086860 dated Feb. 28, 2017.
Office Action issued in Chinese Appln. No. 201680073990.9 dated Jan. 16, 2020. English translation provided.
Office Action issued in Chinese Appln No. 201680073990.9 dated Jul. 29, 2020. English translation provided.
Notice of Allowance issued in U.S. Appl. No. 16/006,026 dated Oct. 7, 2020.

WIRELESS COMMUNICATION DEVICE

CROSS REFERENCE TO RELATED APPLICATIONS

This application is based on Japanese Patent Application (No. 2015-247893) filed on Dec. 18, 2015, the contents of which are incorporated herein by reference.

BACKGROUND OF THE INVENTION

1. Field of the Invention

The present invention relates to a wireless communication device.

2. Background Art

As a conventional technique for realizing, as a wireless communication device for a wireless LAN, a wireless communication device including a directional antenna and a wireless communication device including a non-directional antenna as one device, an antenna device having the following structure has been proposed (JP-A-2005-26943): A director for a prescribed wavelength, a reflector and a radiator are constructed so as to make the positional relationship thereamong variable, and a first disposition in which the director, the reflector and the radiator are disposed at a prescribed interval in parallel one another to have the same center for functioning as a directional antenna and a second disposition in which at least one of the director, the reflector and the radiator is changed in its position for functioning as a non-directional antenna can be switched therebetween.

In such an antenna device, the positional relationship among the director, the reflector and the radiator can be changed, and the first disposition for functioning as a directional antenna can be changed to/from the second disposition for functioning as a non-directional antenna, and therefore, although it is one antenna device, it can be used not only as a directional antenna but also as a non-directional antenna.

In the technique disclosed in JP-A-2005-26943, however, although a limitless number of radiation patterns can be realized by changing the position of the radiator, a general user cannot determine which position is the optimal disposition, and there arises a problem that a gain is degraded on the contrary depending on the positional relationship among the director, the reflector and the radiator.

SUMMARY OF THE INVENTION

The present invention is devised to solve the problem of the conventional technique described above, and an object is to provide a wireless communication device whose directivity can be easily changed by a general user.

One embodiment of the present invention provides a wireless communication device, including: a housing; a substrate provided inside the housing; an antenna provided on the substrate; a metal plate removably attached onto the housing, having reflectance higher than reflectance of the housing, and having an opposing surface opposing the substrate when attached on the housing; a detection unit that detects attachment of the metal plate; and an output unit that outputs a detection result of the detection unit.

Another embodiment of the present invention provides a wireless communication device, including: a housing; a substrate provided inside the housing; an antenna provided on the substrate; a switching unit that switches directivity of the antenna between a first state and a second state; a detection unit that detects switching of the switching unit; and an output unit that outputs a detection result of the detection unit.

According to the present invention, a wireless communication device whose directivity can be easily changed by a general user can be provided.

DETAILED DESCRIPTION OF THE EXEMPLARY EMBODIMENTS

Preferred embodiments of the present invention will now be described in detail with reference to the accompanying drawings. It is noted that the following embodiments are described merely as exemplified embodiments, and that the present invention is not limited to these embodiments. Incidentally, in the drawings referred to in the embodiments, like signs or similar signs (signs of numerical values followed by A, B and the like) are used to refer to like elements or elements having like functions, so as to avoid redundant description in some cases. Besides, for convenience of description, dimensional proportions in the drawings may be different from actual proportions or a structure may be partly omitted in the drawings in some cases.

First Embodiment

Figure 1:
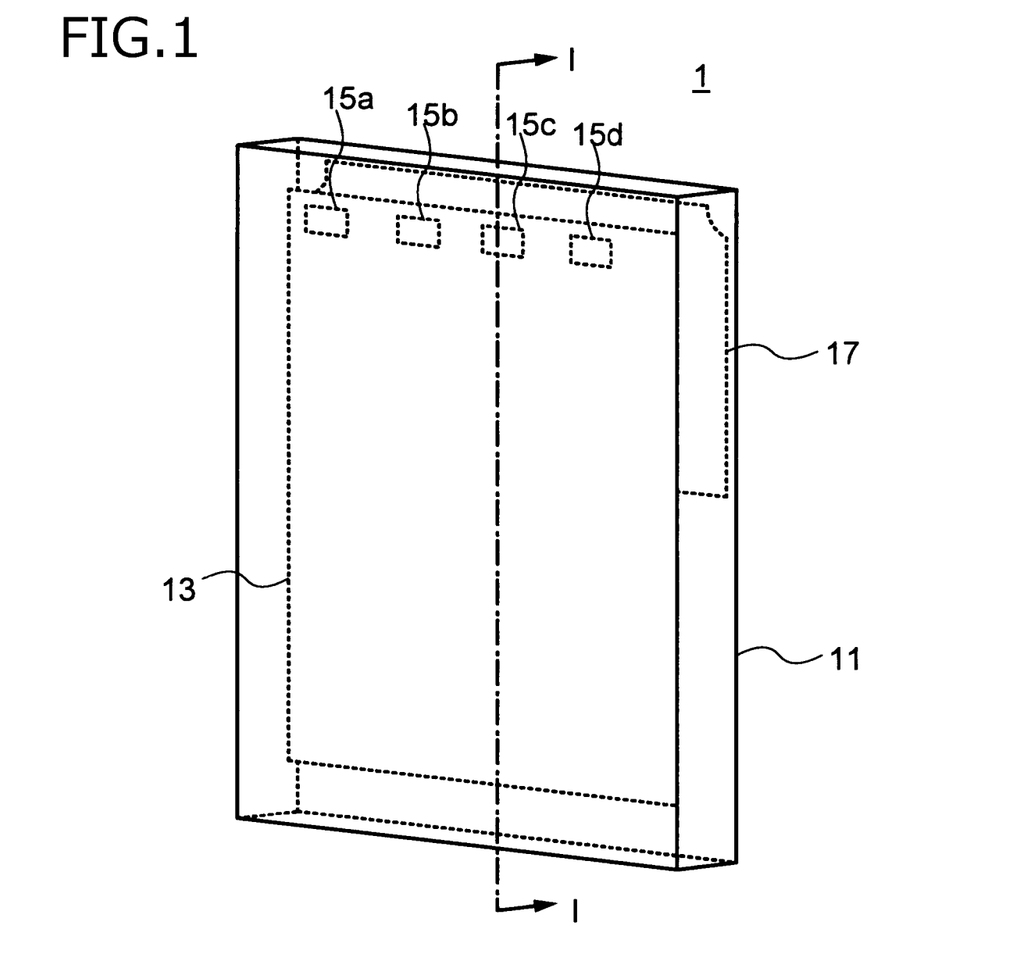
FIG. 1 is an explanatory diagram (a perspective view) illustrating an outline structure of a wireless communication device according to one embodiment of the present invention.
Figure 2:
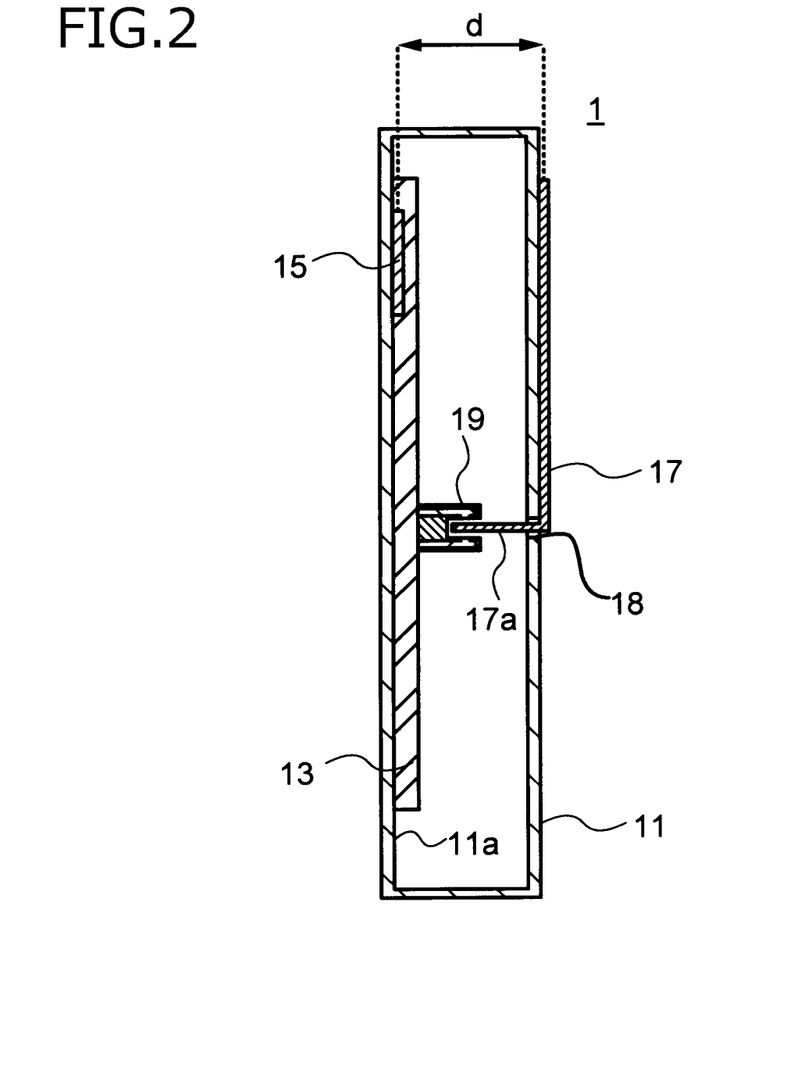
FIG. 2 is a cross-sectional view of the wireless communication device taken on line I-I of FIG. 1.

A wireless communication device according to one embodiment of the present invention will be described with reference to FIGS. 1 and 2. FIG. 1 is an explanatory diagram (a perspective view) illustrating an outline structure of the wireless communication device of the embodiment of the present invention. FIG. 2 is a cross-sectional view of the wireless communication device taken on line I-I of FIG. 1. The wireless communication device 1 includes a housing 11, a substrate 13, antennas 15$a$ to 15$d$, a metal plate 17, an opening 18 and a detection unit 19. It is noted that the antenna is referred to as the "antenna 15" if there is no need for distinguish.

The housing 11 is in a rectangular parallelepiped shape in this exemplified case, and may be in any shape as long as the antenna 15 can be disposed at a prescribed distance d from the metal plate 17. The housing 11 is made of a resin material in this exemplified case. The material of the housing 11 is not, however, limited to the resin material as long as it is not a material working as a reflective plate, such as a metal material.

Besides, the housing 11 has the opening 18 in this exemplified case. When seen in a cross-sectional view as in FIG. 2, the opening 18 is positioned in the vicinity of a center of the housing 11. The position of the opening 18 is not, however, limited to the vicinity of the center of the housing 11 as long as the metal plate 17 is disposed in a position opposing the antenna when the metal plate 17 is attached onto the housing 11.

The substrate 13 is provided inside the housing 11. In this exemplified case, the substrate 13 is provided on an inner side surface 11$a$ of the housing 11, but a part of the substrate 13 may not be in contact with the inner side surface 11$a$ of the housing 11. Besides, although the substrate 13 is formed in a single layer in this exemplified case, it may be formed in multiple layers. When it is formed in multiple layers, the antenna 15 may be positioned in an inner layer as described later.

The antenna 15 is provided on the substrate 13. Although the number of elements of the antennas 15 is four in this exemplified case, the number is not limited to this but may be one or plural excluding four.

Besides, the antenna 15 is a planar antenna in this exemplified case. Furthermore, the antenna 15 is formed by printing on the substrate 13 in this exemplified case. The antenna 15 is not limited to the planar antenna printed on the substrate 13, but may be another planar antenna such as a planar inverted-F antenna (PIFA) or a patch antenna mounted on the substrate 13.

Although the antenna 15 is constructed on the front surface of the substrate 13 in this exemplified case, it may be constructed on a rear surface. When the substrate 13 is a multilayered substrate, the antenna 15 may be constructed in an inner layer.

In this exemplified case, a known split ring resonator (not shown) is disposed between the antenna elements for avoiding interference between the antenna elements. When a split ring resonator is disposed between the antenna elements, a distance between the antenna elements is shorter as compared with a case where it is not disposed. In this exemplified case, the distance between the antenna elements is $\lambda/2$. However, the split ring resonator need not be always disposed. When the split ring resonator is not disposed, the distance between the antenna elements is preferably equal to or larger than $\lambda$. In this exemplified case, the antenna 15 is an antenna for 5 GHz band wireless communication. Therefore, the distance between the antenna elements is preferably 60 mm or more. However, an antenna for 2.45 GHz band wireless communication may be used.

The metal plate 17 has a function to reflect radio waves. In this exemplified case, the metal plate 17 reflects radio waves radiated from the antenna 15. The reflectance of the metal plate 17 is higher than the reflectance of the housing 11. When the metal plate 17 is disposed, in a plan view, between the antenna 15$a$ and the antenna 15$d$, increase of forward gain is reduced as compared with a case where the antennas 15$a$ to 15$d$ are disposed, in a plan view, inside the metal plate 17. Therefore, the antennas 15$a$ to 15$d$ are preferably disposed, in a plan view, inside the metal plate 17.

A projection 17$a$ is a part of the metal plate 17 in this exemplified case. Specifically, the projection 17$a$ and the metal plate 17 are made of the same material. When made of the same material, the projection 17$a$ and the metal plate 17 can be integrally produced. The projection 17$a$ and the metal plate 17 may be, however, made of different materials. When made of different materials, the projection 17$a$ and the metal plate 17 need to be connected to each other. Besides, the projection 17$a$ is inserted into the housing 11.

When the metal plate 17 is attached onto the housing 11, the metal plate 17 has a surface opposing the substrate 13 and the antenna 15 provided on the substrate 13. In this exemplified case, the number of antenna elements provided on the substrate is four. When the number of the antenna elements is plural, distances from the respective antennas to the metal plate 17 are preferably equal. If the distances from the respective antennas to the metal plate 17 are different, there arises a difference in a degree of overlap between radio waves radiated by the respective antennas and radio waves reflected by the metal plate 17, and hence the directivity and the magnitude of the forward gain are affected. Therefore, in this exemplified case, the distances from the four antennas 15 to the metal plate 17 are equal. Specifically, the four antennas are parallel to the metal plate 17. In other words, the substrate 13 having the antennas 15 provided thereon is preferably parallel to the metal plate 17.

In order that the metal plate 17 is attached onto the housing 11 so that the metal plate 17 can be difficult to remove from the housing 11, irregular portions may be provided on a part of the housing 11, and the metal plate 17 may be in a shape to be engaged with the irregular portions.

In order that the metal plate 17 exhibits an effect as a reflective plate, the radio waves radiated from the respective antennas 15 and the radio waves reflected by the metal plate 17 need to be in phase. Therefore, the distance d from the respective antennas 15 to the metal plate 17 is, in terms of a radio frequency to be employed, preferably larger than λ/12 and smaller than 5λ/12. More preferably, the distance d from the respective antennas 15 to the metal plate 17 is, in terms of the radio frequency to be employed, λ/6 or larger and λ/3 or smaller. When the distance d from the respective antennas 15 to the metal plate 17 is λ/4, the radio waves radiated from the antennas 15 and the radio waves reflected by the metal plate 17 are in phase, so as to increase the forward gain. Therefore, the distance d from the respective antennas 15 to the metal plate 17 is, in terms of the radio frequency to be employed, more preferably λ/4. In this exemplified case, the radio frequency to be employed is the 5 GHz band. Accordingly, the distance d from the respective antennas 15 to the metal plate 17 is more preferably 15 mm.

Figure 3A:
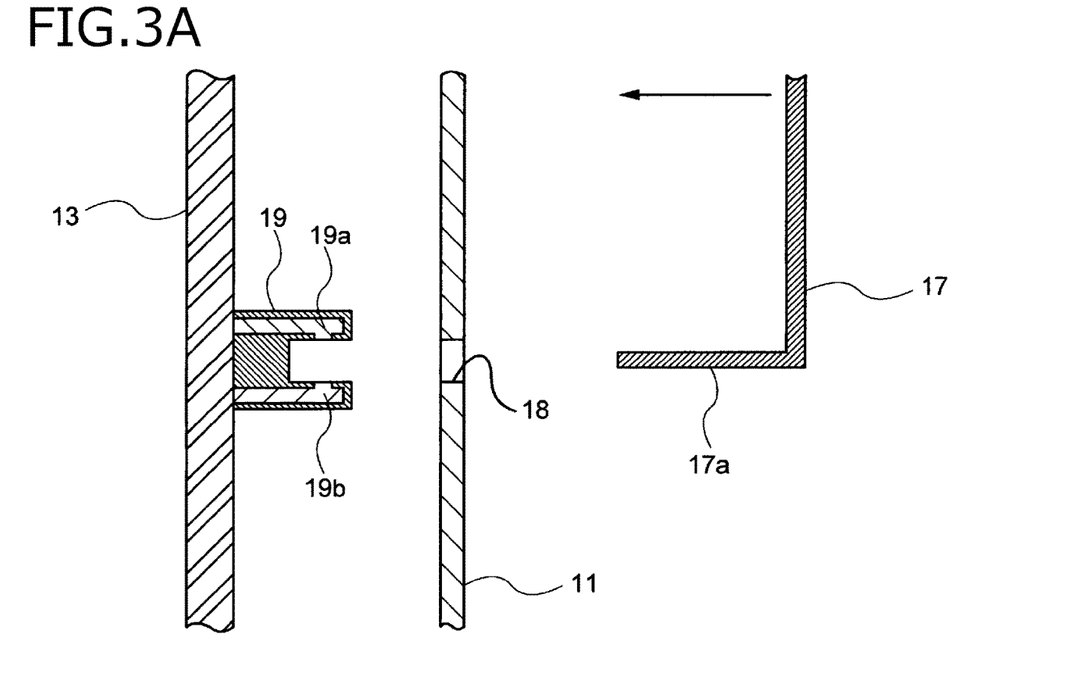
FIG. 3A is an enlarged view (a cross-sectional view) of a portion around a detection unit in the wireless communication device according to the embodiment of the present invention when a metal plate is not attached onto a housing in the wireless communication device.
Figure 3B:
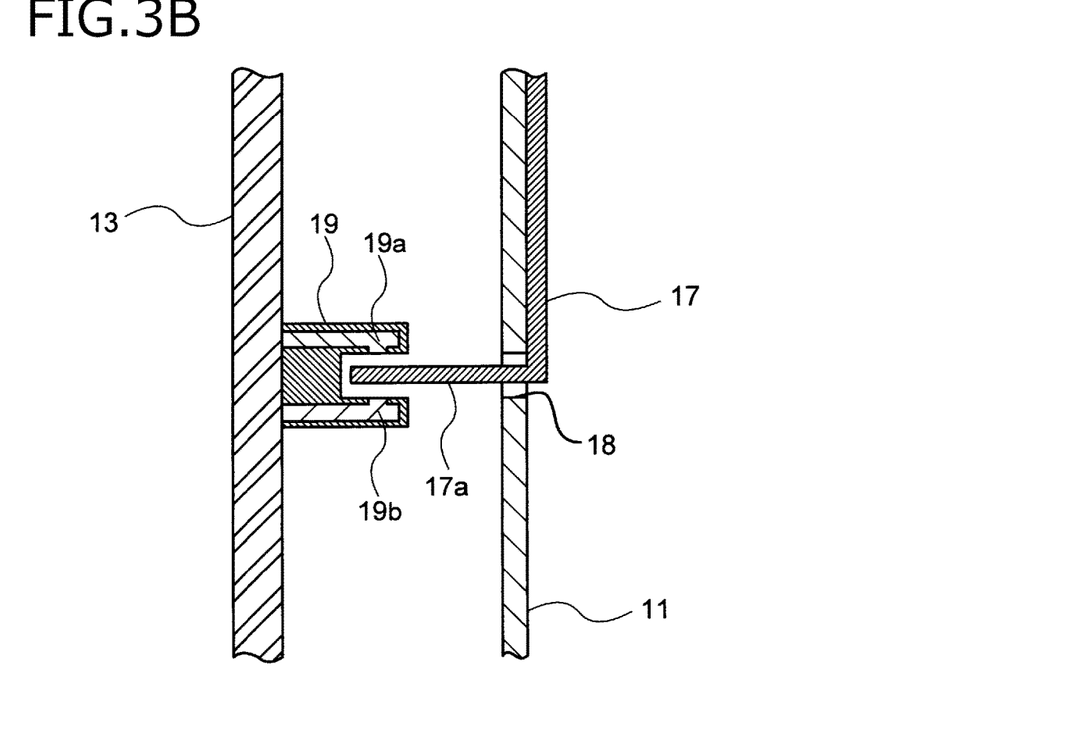
FIG. 3B is an enlarged view (a cross-sectional view) of the portion around the detection unit in the wireless communication device according to the embodiment of the present invention when the metal plate is attached onto the housing in the wireless communication device.

The detection unit 19 detects attachment of the metal plate 17. FIG. 3 is an enlarged view (a cross-sectional view) of a portion around the detection unit of the wireless communication device of the embodiment of the present invention. In this exemplified case, the detection unit 19 is a photo interrupter. The photo interrupter includes a light emitting portion 19a and a light receiving portion 19b opposing each other, and when the light receiving portion 19b detects that light from the light emitting portion 19a is blocked by the projection 17a, the attachment of the metal plate 17 onto the housing 11 is detected. Therefore, the detection unit 19 can detect, without coming into contact with the projection 17a, that the metal plate 17 has been attached onto the housing 11. The detection unit 19 is, however, not limited to the photo interrupter but may be another non-contact sensor.

FIG. 3A is an enlarged view (a cross-sectional view) of the portion around the detection unit of the wireless communication device of the embodiment of the present invention when the metal plate is not attached onto the housing. FIG. 3B is an enlarged view (a cross-sectional view) of the portion around the detection unit of the wireless communication device of the embodiment of the present invention when the metal plate is attached onto the housing.

The metal plate 17 is moved in a direction illustrated with an arrow in the drawing as illustrated in FIG. 3A, and when the light receiving portion 19b detects that the light from the light emitting portion 19a is blocked by the projection 17a as illustrated in FIG. 3B, it is detected that a case including the metal plate 17 has been attached onto the housing 11.

Figure 4:
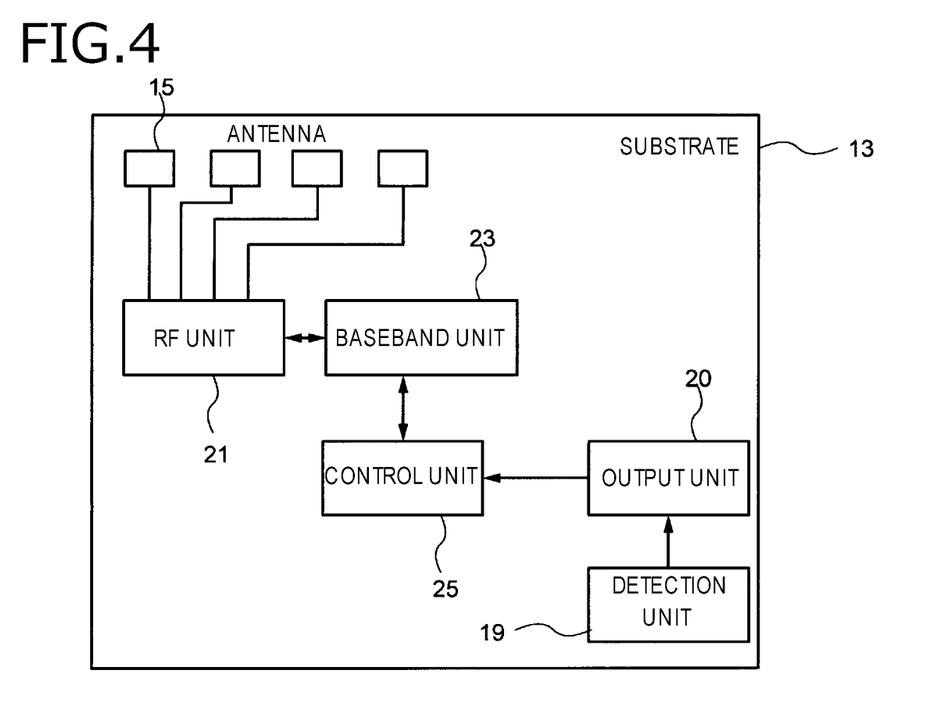
FIG. 4 is a block diagram used for explaining a part of the wireless communication device according to the embodiment of the present invention.

FIG. 4 is a block diagram used for explaining a part of the wireless communication device of the embodiment of the present invention. The substrate 13 includes the antennas 15, the detection unit 19, an output unit 20, an RF unit 21, a baseband unit 23, and a control unit 25.

The RF unit 21 processes a signal of the frequency band used in the wireless communication device 1. In this exemplified case, the RF unit 21 processes a signal of the 5 GHz band. The RF unit 21 is connected to the antennas 15. Besides, the RF unit 21 is connected to the baseband unit 23. In this exemplified case, since the frequency band is as high as 5 GHz, a receiving mixer present in the RF unit 21 converts the high frequency into an intermediate frequency (IF), which is then converted into a baseband signal. Incidentally, the RF unit 21 has a known structure including various transmitting/receiving mixers, an amplifier such as an LNA, and a filter such as bandpass filter, which will not be described herein.

The control unit 25 controls an operation mode on the basis of a detection result output by the output unit. The control unit 25 performs, for example, re-transmission control when an error occurs on a receiver side in decoding a signal sent from a transmitter side, and various controls for wireless LAN communication including transmission timing control. Besides, when the detection unit 19 detects that the metal plate 17 has been attached onto the housing 11, the control unit 25 may perform control for reducing transmission power output of the antenna 15.

The output unit 20 outputs a detection result of the detection unit 19. Then, the thus output result is used by the control unit 25.

<Simulation>

Figure 5:
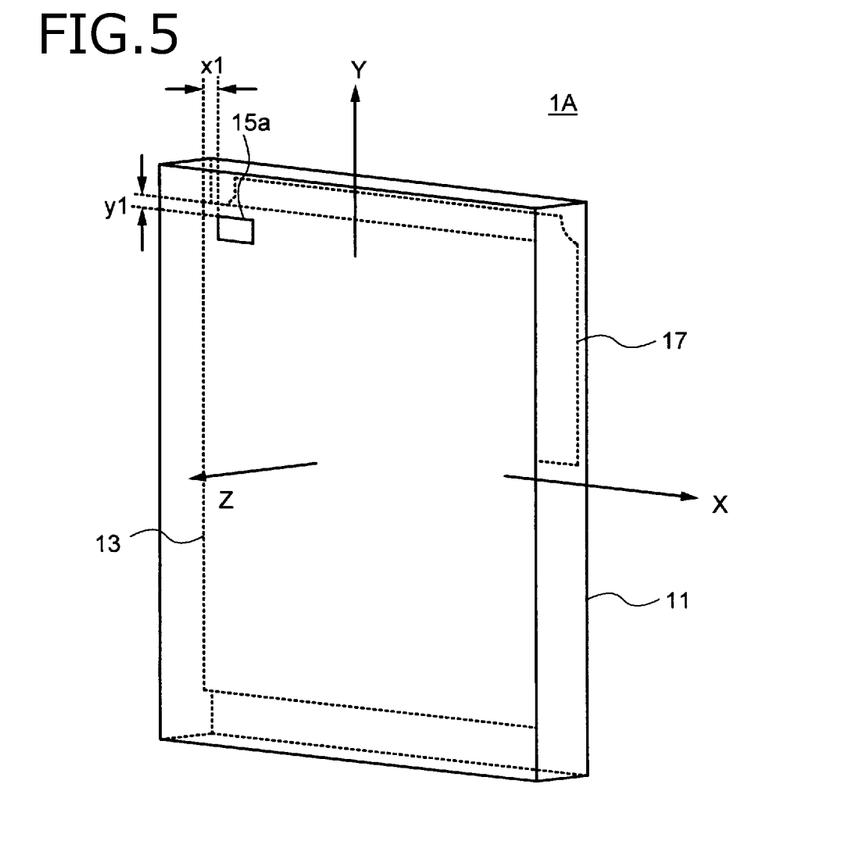
FIG. 5 is a diagram used for explaining a simulation situation for checking directivity of the wireless communication device according to the embodiment of the present invention.
Figure 6A:
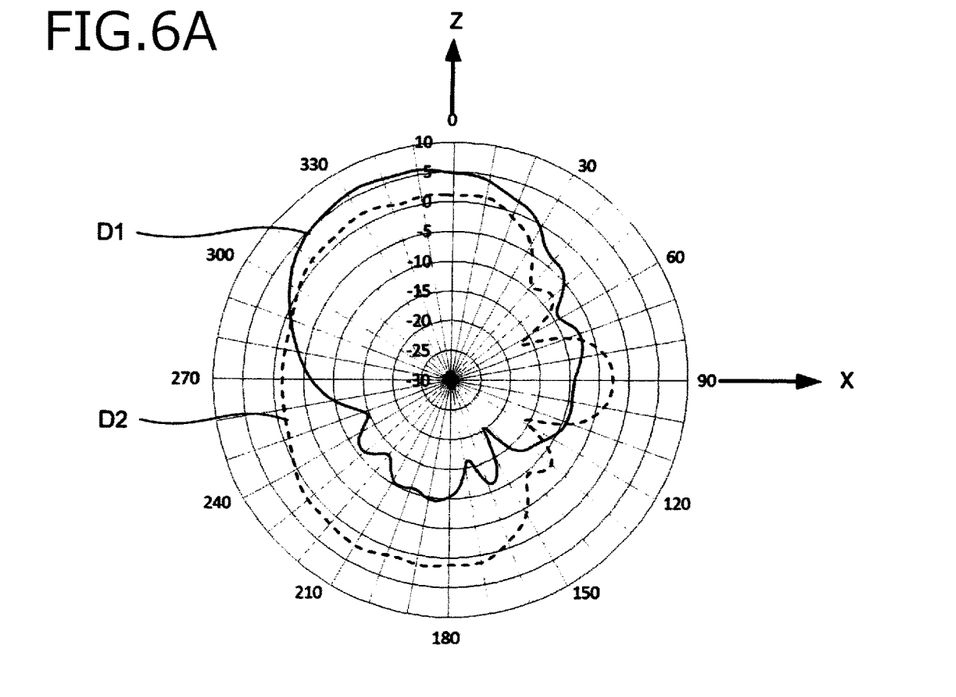
FIG. 6A illustrates results of the simulation for the directivity of the wireless communication device according to the embodiment of the present invention.
Figure 6B:
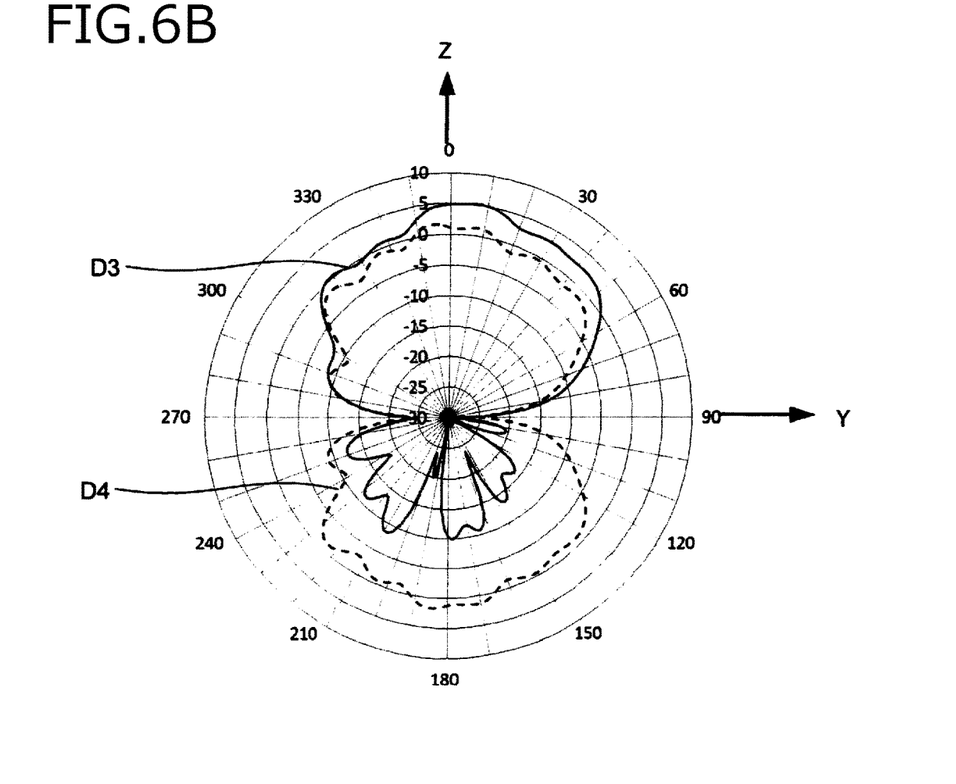
FIG. 6B illustrates other results of the simulation for the directivity of the wireless communication device according to the embodiment of the present invention.

Referring to FIGS. 5, 6A and 6B, change in the directivity depending on the presence of the metal plate 17 in the wireless communication device according to the embodiment of the present invention will be described. FIG. 5 is a diagram used for explaining a simulation situation for checking directivity of the wireless communication device according to the embodiment of the present invention. FIGS. 6A and 6B illustrate results of the simulation for the directivity of the wireless communication device according to the embodiment of the present invention.

As illustrated in FIG. 5, a wireless communication device 1A includes a housing 11, a substrate 13 provided inside the housing, an antenna 15a provided on the substrate 13, a metal plate (a reflective plate) 17 removably attached onto the housing to be parallel to the substrate 13 when attached, a detection unit (not shown) detecting the attachment of the metal plate 17, and an output unit (not shown) outputting a detection result of the detection unit.

The antenna 15a is disposed in a position at distances x1=10 mm and y1=5 mm from the left end of the substrate 13. The antenna 15a is a planar antenna for the 5 GHz band. Besides, the housing 11 is a case made of a resin material. The resin case is designed so that a distance from the antenna 15a to the metal plate (the reflective plate) 17 can be λ/4 (15 mm).

As illustrated in FIG. 6, it is assumed, on a plane equivalent to the substrate 13, that a lateral direction is defined as the X-axis direction, that a vertical direction is defined as the Y-axis direction, and that a direction vertical to the substrate 13 and opposite to the metal plate 17 (corresponding to a front direction of the wireless communication device 1A) is defined as the Z-axis direction. As illustrated in FIG. 6A, D1 (a solid line) corresponds to an antenna gain obtained when the metal plate 17 is attached onto the housing 11, and D2 (a broken line) corresponds to an antenna gain obtained when the metal plate 17 is not attached onto the housing 11. When the metal plate 17 is not attached onto the housing 11, the antenna gain in the Z-axis direction is approximately 1 dBi. On the other hand, when the metal plate 17 is attached onto the housing 11, the antenna gain in the Z-axis direction is approximately 5 dBi. Similarly, as illustrated in FIG. 6B, D3 (a solid line) corresponds to an antenna gain obtained when the metal plate 17 is attached onto the housing 11, and D4 (a broken line) corresponds to an antenna gain obtained when the metal plate 17 is not attached onto the housing 11. When the metal plate 17 is not attached onto the housing 11, the antenna gain in the Z-axis direction is approximately 1 dBi. On the other hand, when the metal plate 17 is attached onto the housing 11, the antenna gain in the Z-axis direction is approximately 5 dBi. In this manner, when the metal plate 17 is attached onto the housing 11, the antenna gain in the Z-axis direction is increased by 3 dB or more, and thus, it is understood that when the metal plate 17 is attached onto the housing 11, the antenna 15a operates as a highly directional antenna. On the other hand, when the metal plate 17 is not attached onto the housing 11, the antenna 15a does not have a large antenna gain in any directions, and hence, it is understood that it operates as a low directional antenna. Specifically, the metal plate 17 can be regarded as a switching unit for switching between a state where the directivity of the antenna is relatively low (a first state) and a state where it is high (a second state). Then, the detection unit detects the switching of the switching unit.

The present embodiment exhibits an effect that a wireless communication device including an antenna having low directivity can be switched to a wireless communication device including an antenna having high directivity by a simple method of attaching the metal plate 17 onto the housing 11.

In recent years, as an information transmission method via wireless communication, attention is paid to a MIMO (multiple input multiple output) method in which a plurality of antennas are provided both on a transmitter side and a receiver side to construct a multiple-input multiple-output system via wireless lines (channels). When a plurality of antennas are provided in a device of the conventional technique for coping with the MIMO method or the like, there arises a problem that a plurality of directors and reflectors are necessary.

On the other hand, in the present embodiment, a plurality of antennas 15 are formed on one substrate 13. Specifically, the plural antennas 15 are formed on the same plane. Then, the substrate 13 including the plural antennas 15 opposes the metal plate (the reflective plate) 17. When the substrate 13 including the plural antennas 15 and the metal plate (the reflective plate) 17 are in parallel to each other, merely one reflective plate is sufficiently used. Accordingly, an effect is exhibited that a wireless communication device not requiring a plurality of reflectors even when a plurality of antennas are provided for coping with the MIMO method or the like can be provided.

In the present embodiment, the detection unit 19 automatically detects whether or not the metal plate 17 has been attached onto the housing 11. Therefore, an effect is exhibited that the control unit 25 can automatically switch the transmission output power of the wireless communication device 1 in response to the detection.

When the projection 17a is made of the same material as the metal plate 17, an effect is exhibited that they can be integrally produced. Besides, the projection 17a can be used not only for determining the distance from the substrate 13 including the plural antennas 15 to the metal plate (the reflective plate) 17 but also for performing the detection with the detection unit 19. Therefore, an effect is exhibited that the one projection 17a has two roles.

Besides, in the present invention, the detection unit 19 can detect that the metal plate 17 has been attached onto the housing 11 without coming into contact with the projection 17a by using a photo interrupter or the like. Therefore, an effect is exhibited that the detection unit 19 and the projection 17a are both difficult to mechanically break.

Second Embodiment

Figure 7A:
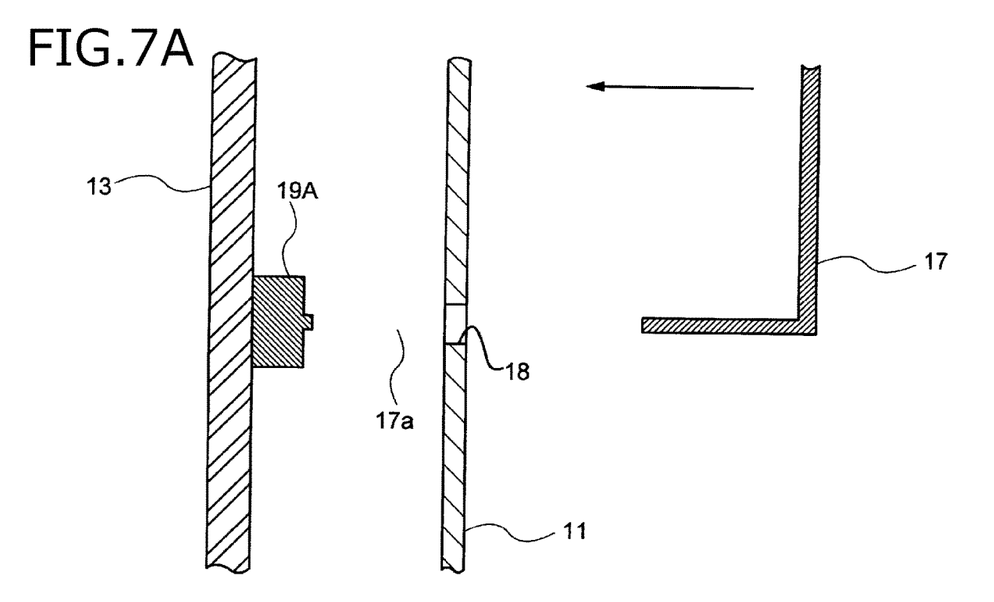
FIG. 7A is an enlarged view (a cross-sectional view) of a portion around a detection unit of a wireless communication device according to another embodiment of the present invention when a metal plate is not attached onto a housing in the wireless communication device.
Figure 7B:
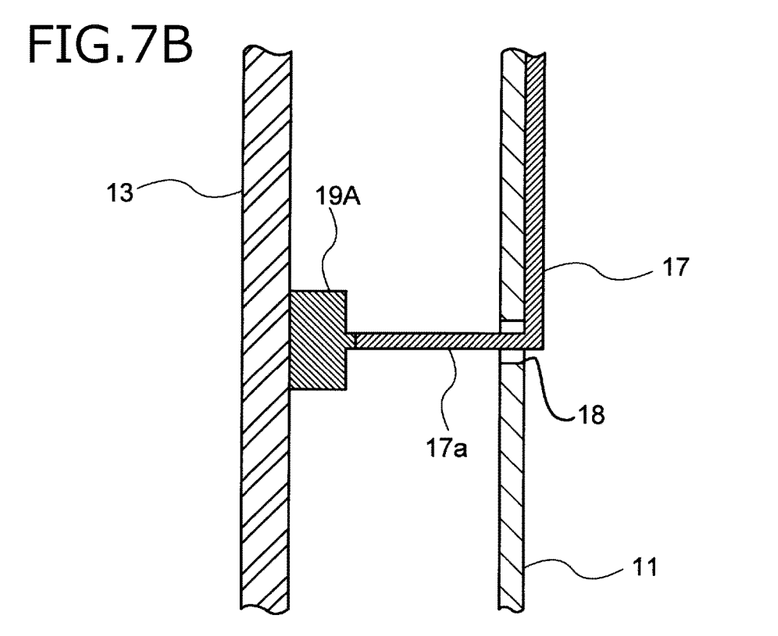
FIG. 7B is an enlarged view (a cross-sectional view) of the portion around the detection unit of the wireless communication device according to another embodiment of the present invention when the metal plate is attached onto the housing in the wireless communication device.

Referring to FIGS. 7A and 7B, a second embodiment of the present invention will be described. FIG. 7A is an enlarged view (a cross-sectional view) of a portion around a detection unit of a wireless communication device according to another embodiment of the present invention when a metal plate is not attached onto a housing in the wireless communication device. FIG. 7B is an enlarged view (a cross-sectional view) of the portion around the detection unit of the wireless communication device according to the another embodiment of the present invention when the metal plate is attached onto the housing in the wireless communication device. The present embodiment is roughly the same as the first embodiment although the detection unit is different. Therefore, a difference will be described in detail with the description of the same elements omitted.

A detection unit 19A is a push switch in this exemplified case. When the push switch is pushed by the projection 17a, it is detected that the metal plate 17 has been attached onto the housing 11. Accordingly, the detection unit 19A comes into contact with the projection 17a. The automatic detection of the metal plate 17 using a switch is not limited to that using a push switch, but a lever switch or the like may be used.

When the metal plate 17 is moved in a direction illustrated with an arrow in the drawing as illustrated in FIG. 7A so as to push the push switch (the detection unit 19A) with the projection 17a of the metal plate 17 as illustrated in FIG. 7B, the detection unit 19A detects that the a case including the metal plate 17 has been attached onto the housing 11.

Also the present embodiment exhibits similar effects to those of the first embodiment except for the effect that the detection unit 19 and the projection 17a are difficult to mechanically break.

Besides, in the present embodiment, the detection unit 19 is not a non-contact sensor such as a photo interrupter but the push switch or the like. In general, the push switch is more inexpensive than a photo interrupter or the like. Accordingly, the present embodiment exhibits an effect that the detection unit 19 can be more inexpensively constructed.

Third Embodiment

Figure 8:
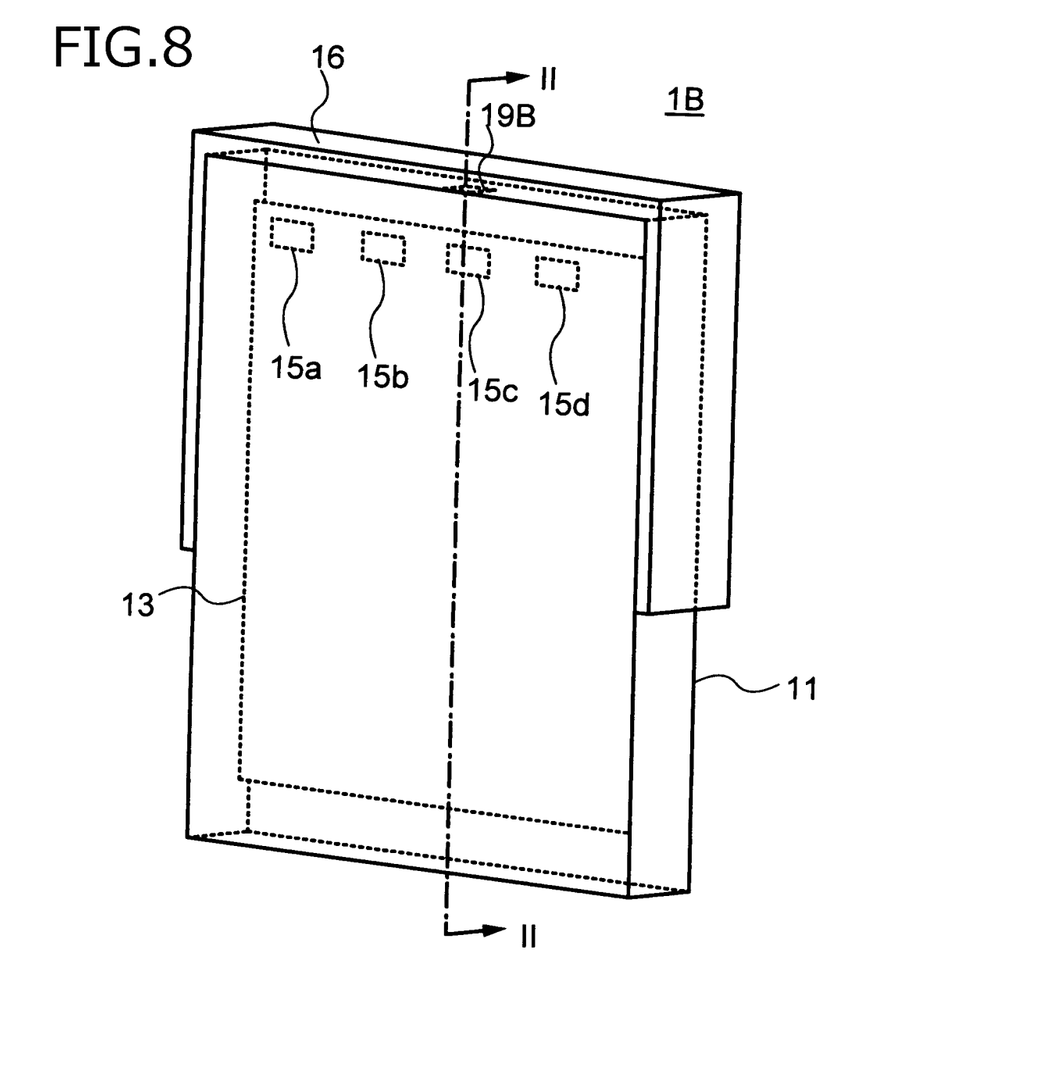
FIG. 8 is an explanatory diagram (a perspective view) illustrating an outline structure of a wireless communication device according to still another embodiment of the present invention.
Figure 9:
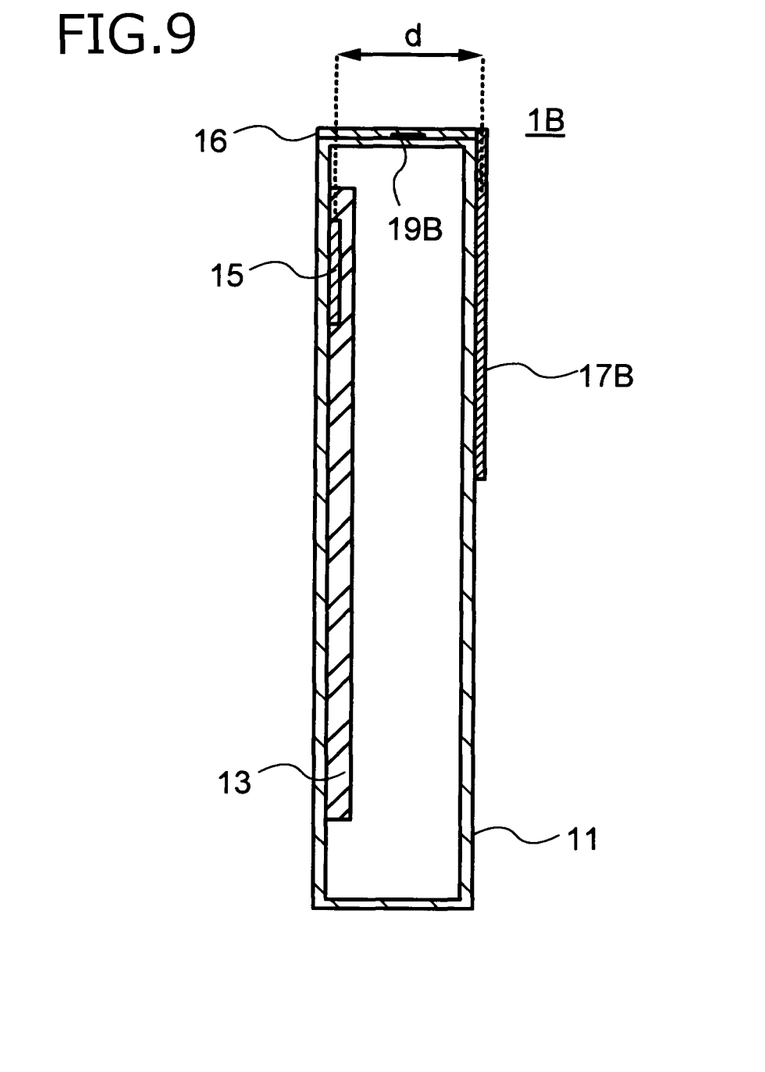
FIG. 9 is a cross-sectional view of the wireless communication device taken on line II-II of FIG. 8.

Referring to FIGS. 8 and 9, a wireless communication device according to still another embodiment of the present invention will be described. FIG. 8 is an explanatory diagram (a perspective view) illustrating an outline structure of the wireless communication device according to the still another embodiment of the present invention. FIG. 9 is a cross-sectional view of the wireless communication device taken on line II-II of FIG. 8. The present embodiment is roughly the same as the first embodiment although it is different in the position of a detection unit and absence of the opening. Therefore, differences alone will be described in detail with the description of the same elements omitted.

In this exemplified case, a detection unit 19B is a push switch provided on an upper surface of the housing 11. In a case 16 covering the housing 11, a surface in parallel to the substrate 13 corresponds to a metal plate 17B.

In order that the case 16 is provided on the housing 11 so that the case 16 is difficult to remove from the housing 11, irregularities may be provided on the upper surface of the housing 11 so as to be engaged with the case 16. If the irregularities are too high, however, it is apprehended that the detection unit 19B may not function, and therefore, the irregularities are provided as long as the detection unit 19B functions.

Figure 10A:
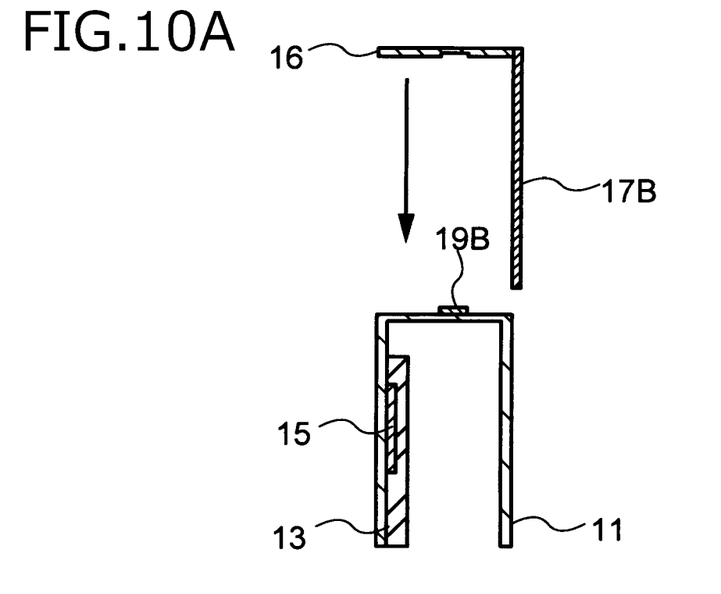
FIG. 10A is an enlarged view (a cross-sectional view) of a portion around a detection unit of the wireless communication device according to the still another embodiment of the present invention when a metal plate is not attached onto a housing in the wireless communication device.
Figure 10B:
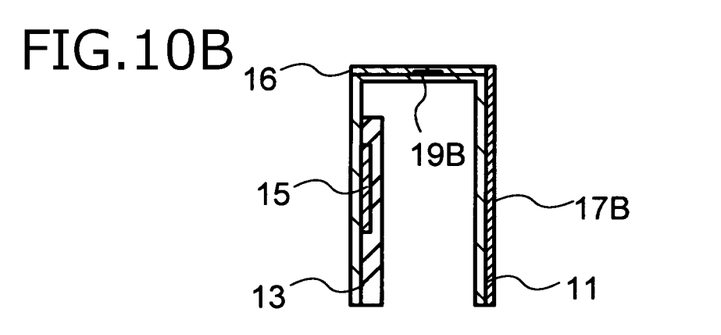
FIG. 10B is an enlarged view (a cross-sectional view) of the portion around the detection unit of the wireless communication device according to the still another embodiment of the present invention when the metal plate is attached onto the housing in the wireless communication device.

FIG. 10A is an enlarged view (a cross-sectional view) of a portion around the detection unit of the wireless communication device according to the still another embodiment of the present invention when the metal plate is not attached onto the housing in the wireless communication device. FIG. 10B is an enlarged view (a cross-sectional view) of the portion around the detection unit of the wireless communication device according to the still another embodiment of the present invention when the metal plate is attached onto the housing in the wireless communication device.

When the case 16 is moved in a direction illustrated with an arrow in the drawing as illustrated in FIG. 10A so as to push the push switch (the detection unit 19B) with a recess 16b of the case 16 as illustrated in FIG. 10B, the detection unit 19B detects that the case including the metal plate 17 has been attached onto the housing 11.

Also the present embodiment exhibits effects similar to those of the first embodiment.

Besides, since the detection unit 19B is provided on the upper surface of the housing 11 in the present embodiment, the housing 11 does not have an opening like the opening 18 of the first embodiment. Therefore, an effect is exhibited that when a general user attaches the case 16 including the metal plate 17 onto the housing 11, he/she can attach it while visually checking the detection unit 19B.

Fourth Embodiment

The present embodiment is roughly the same as the first embodiment. The present embodiment is different from the first embodiment in the function of a control unit. Therefore, a difference will be described in detail with the description of the same elements omitted.

Figure 11:
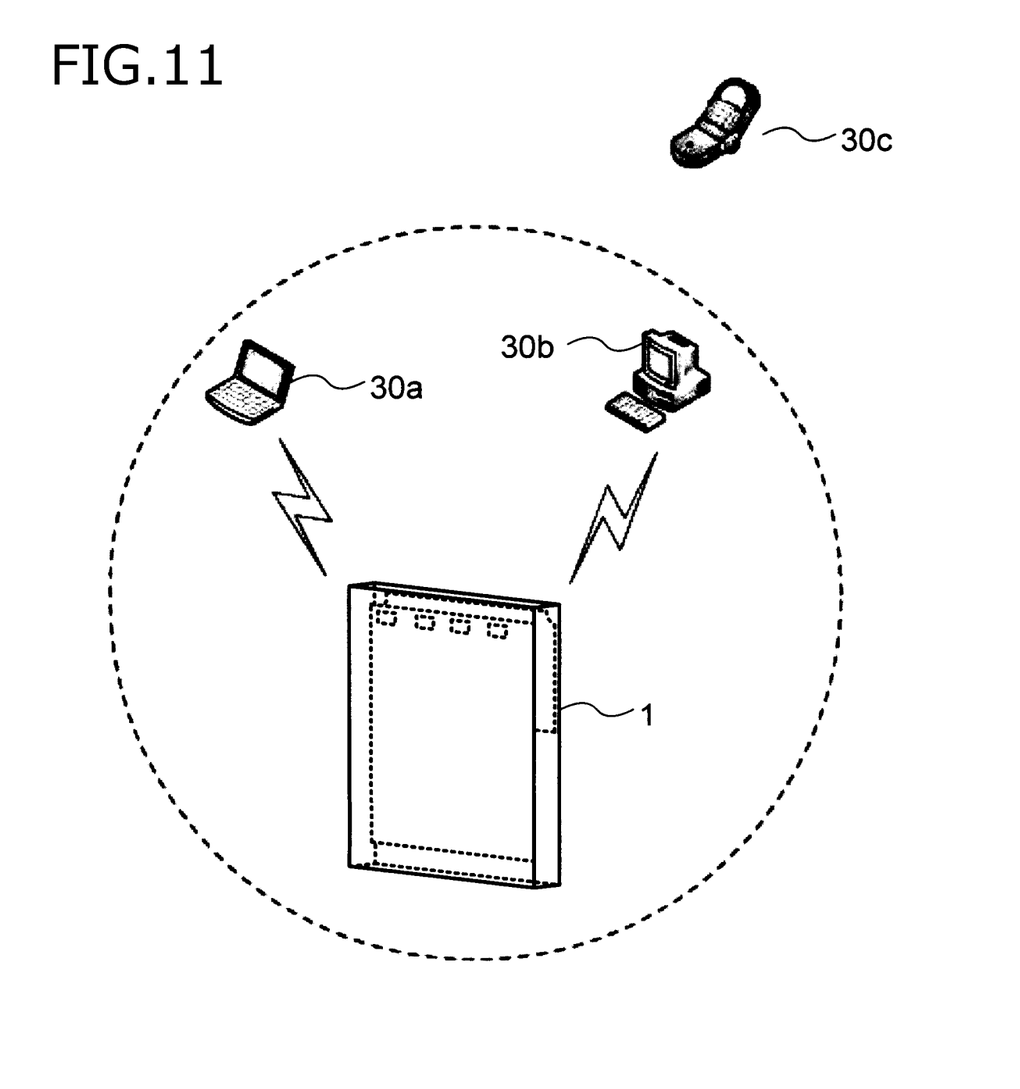
FIG. 11 is a conceptual diagram used for explaining a relationship between a wireless communication device according to another embodiment of the present invention and a communication partner terminal.

In the present embodiment, in a case where a restriction is placed on a communication partner terminal communicating with the wireless communication device 1, for example, in a case where a threshold value is provided in receiver sensitivity of a signal received from a communication partner terminal, when the detection unit 19 detects that the metal plate 17 has been attached onto the housing 11, a control unit changes the threshold value of the receiver sensitivity of the communication partner terminal to communicate with. For example, when the metal plate (the reflective plate) 17 is not attached onto the housing 11 of the wireless communication device 1, and communication is to be performed with a communication partner terminal receiving a signal with receiver sensitivity of −80 dB or more, as illustrated in FIG. 11, communication partner terminals 30a and 30b are communicating with the wireless communication device 1 but a communication partner terminal 30c present outside a house illustrated with a broken line is not communicating with the wireless communication device 1. Here, the control unit may control a threshold value so as to perform the communication with the communication partner terminals 30a and 30b receiving a signal with the receiver sensitivity of −80 dBm or more when the metal plate (the reflective plate) 17 is not attached onto the housing 11 of the wireless communication device 1, but to perform communication merely with the communication partner terminals 30a and 30b receiving a signal with the receiver sensitivity of −77 dBm or more when the metal plate (the reflective plate) 17 is attached onto the housing 11. This is because a received level of the wireless communication device can be improved by the metal plate 17 when the metal plate (the reflective plate) 17 is attached onto the housing 11. Incidentally, the receiver sensitivity is measured with RSSI (received signal strength indication, received signal strength indicator, or received signal strength). RSSI refers to a circuit or a signal to be used for measuring the intensity of a signal received by wireless communication equipment.

The present embodiment exhibits an effect that a threshold value of a communication partner terminal to communicate with the wireless communication device can be changed by attaching the metal plate 17 onto the housing 11. As a result, an effect is exhibited that optimization of a range of communication partner terminals to communicate with can be retained without unnecessarily covering a communication partner terminal present far away.

Fifth Embodiment

The present embodiment is roughly the same as the first embodiment. The present embodiment is different from the first embodiment in the function of a control unit. Therefore, a difference will be described in detail with the description of the same elements omitted.

In the present embodiment, when the detection unit 19 detects that the metal plate 17 has been attached onto the housing 11, the control unit may prescribe a modulation method or wireless LAN standards. Here, when the metal plate 17 is attached onto the housing 11, a sending and receiving environment for the wireless communication device is better. For example, in a case where the 64 QAM modulation method is employed when the metal plate 17 is not attached onto the housing 11, if the detection unit 19 detects that the metal plate 17 is attached onto the housing 11, the modulation method may be changed to the 256 QAM. Similarly, for example, when the detection unit 19 detects that the metal plate 17 is attached onto the housing 11, IEEE 802.11ac communication is not employed but another communication of IEEE 802.11g or the like may be employed.

The present embodiment exhibits an effect that a modulation method can be changed depending on whether or not the metal plate 17 is attached onto the housing 11.

Sixth Embodiment

The present embodiment is roughly the same as the first embodiment. The present embodiment is different from the first embodiment in the function of a control unit. Therefore, a difference will be described in detail with the description of the same elements omitted.

When the metal plate 17 is attached onto the housing 11, the sending and receiving environment for a wireless communication device is better. Therefore, when the detection unit 19 detects that the metal plate 17 has been attached onto the housing 11, the output unit 20 outputs the detection result, and the control unit 25 controls to send a signal corresponding to the detection of the attachment of the metal plate 17 onto the housing 11. Then, the signal is sent through the antenna 15 to a communication partner terminal. The communication partner terminal having received the signal can reduce power consumption by, for example, reducing an amplification factor of an intermediate frequency amplifier.

The present embodiment exhibits an effect that the wireless communication device sends a signal corresponding to whether or not the metal plate 17 is attached onto the housing 11 to a communication partner terminal depending on whether or not the metal plate 17 is attached onto the housing 11, so that the communication partner terminal can adaptively reduce the power consumption.

It is noted that the present invention is not limited to the above-described embodiments but can be appropriately modified and changed without departing from the spirit thereof.

The antenna may be provided in plural on the substrate.

A part of the metal plate may be inserted into the housing.

The distance between the substrate and the opposing surface may be larger than $\lambda/12$ and smaller than $5\lambda/12$.

The detection unit may detect the attachment of the metal plate without coming into contact with the inserted part of the metal plate.

A control unit that controls an operation mode based on the detection result output by the output unit may be further included.

The control unit may lower an output power of the antenna.

The antenna may send a result detected by the detection unit to a receiver side.

What is claimed is:

1. A wireless communication device comprising:
   a housing;
   a substrate provided inside the housing;
   an antenna provided on the substrate;
   a switching unit configured to switch directivity of the antenna between a first state and a second state;
   a detection unit configured to detect switching of the switching unit; and
   an output unit configured to output a detection result of the detection unit.

2. The wireless communication device according to claim 1, wherein the directivity of the antenna in the first state is lower than that of the antenna in the second state.

3. The wireless communication device according to claim 1, wherein the antenna is provided in plural on the substrate.

4. The wireless communication device according to claim 1, further comprising a control unit configured to control an operation mode based on the detection result output by the output unit.

5. The wireless communication device according to claim 4, wherein the control unit is configured to lower an output power of the antenna.

6. The wireless communication device according to claim 1, wherein the antenna is configured to send a result detected by the detection unit to a receiver side.

7. The wireless communication device according to claim 1, wherein the detection unit is provided on an upper surface of the housing.

8. The wireless communication device according to claim 4, wherein the control unit is configured to set a threshold value of a receiver sensitivity of a signal received from a communication partner terminal based on the detection result output by the output unit.

\* \* \* \* \*